(12) United States Patent
King et al.

(10) Patent No.: US 12,684,063 B2
(45) Date of Patent: Jul. 14, 2026

(54) PRE-CALL VERIFICATION OF CALL PARAMETERS

(71) Applicant: FIRST ORION CORP., North Little Rock, AR (US)

(72) Inventors: Zachary King, Bauxite, AR (US); Caleb Decoux, Conway, AR (US); Jamelle Adnan Brown, Conway, AR (US); Austin Schoessel, Little Rock, AR (US)

(73) Assignee: FIRST ORION CORP., North Little Rock, AR (US)

( * ) Notice: Subject to any disclaimer, the term of this patent is extended or adjusted under 35 U.S.C. 154(b) by 276 days.

(21) Appl. No.: 18/516,871

(22) Filed: Nov. 21, 2023

(65) Prior Publication Data

US 2025/0168275 A1     May 22, 2025

(51) Int. Cl.
*H04W 4/16*          (2009.01)
*H04M 3/42*          (2006.01)
*H04M 3/436*         (2006.01)

(52) U.S. Cl.
CPC ....... *H04M 3/42059* (2013.01); *H04M 3/436* (2013.01); *H04M 2203/6045* (2013.01)

(58) Field of Classification Search
CPC ... H04M 3/42059; H04M 3/436; H04W 4/16; H04W 12/72
See application file for complete search history.

(56) References Cited

U.S. PATENT DOCUMENTS

| | | | |
|---|---|---|---|
| 2004/0054779 A1 | 3/2004 | Takeshima et al. | |
| 2008/0140454 A1 | 6/2008 | Hernandez et al. | |
| 2009/0104922 A1* | 4/2009 | Dudley ................. | H04M 15/50 |
| | | | 455/466 |
| 2010/0114744 A1* | 5/2010 | Gonen ................... | G06Q 40/06 |
| | | | 705/35 |
| 2012/0265755 A1* | 10/2012 | McNally .............. | G06F 16/958 |
| | | | 707/723 |
| 2012/0293304 A1 | 11/2012 | Smith | |
| 2013/0041491 A1* | 2/2013 | Itoyanagi ............... | H04L 67/61 |
| | | | 700/94 |
| 2016/0219142 A1 | 7/2016 | Brown | |
| 2022/0094724 A1 | 3/2022 | Stahl et al. | |

\* cited by examiner

*Primary Examiner* — Sam Bhattacharya

(57)          ABSTRACT

An example telephone number verification process may include receiving telephone numbers assigned to an enterprise entity, comparing each of the telephone numbers to verification criteria, adding a value to telephone number scores assigned to each of the respective plurality of telephone numbers for each valid instance of the verification criteria, comparing the telephone number scores to a threshold, and transmitting a notification indicating each of the plurality of telephone numbers which are valid based on the comparing.

17 Claims, 8 Drawing Sheets

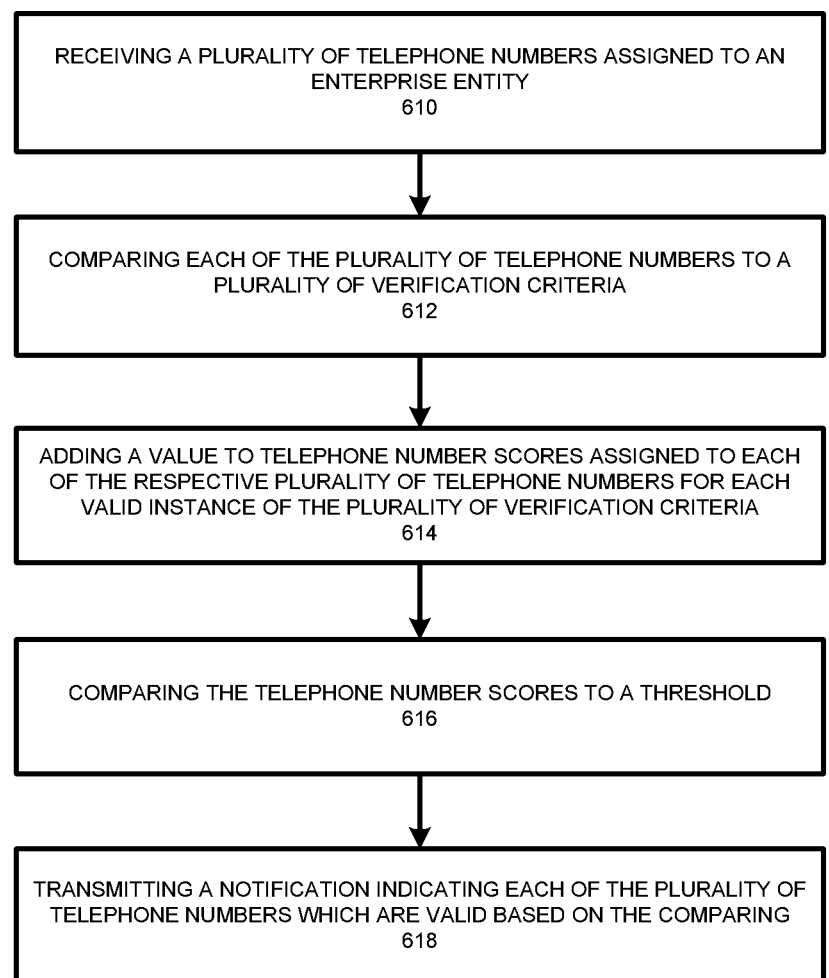

RECEIVING A PLURALITY OF TELEPHONE NUMBERS ASSIGNED TO AN
ENTERPRISE ENTITY
610

COMPARING EACH OF THE PLURALITY OF TELEPHONE NUMBERS TO A
PLURALITY OF VERIFICATION CRITERIA
612

ADDING A VALUE TO TELEPHONE NUMBER SCORES ASSIGNED TO EACH
OF THE RESPECTIVE PLURALITY OF TELEPHONE NUMBERS FOR EACH
VALID INSTANCE OF THE PLURALITY OF VERIFICATION CRITERIA
614

COMPARING THE TELEPHONE NUMBER SCORES TO A THRESHOLD
616

TRANSMITTING A NOTIFICATION INDICATING EACH OF THE PLURALITY OF
TELEPHONE NUMBERS WHICH ARE VALID BASED ON THE COMPARING
618

FIG. 6A

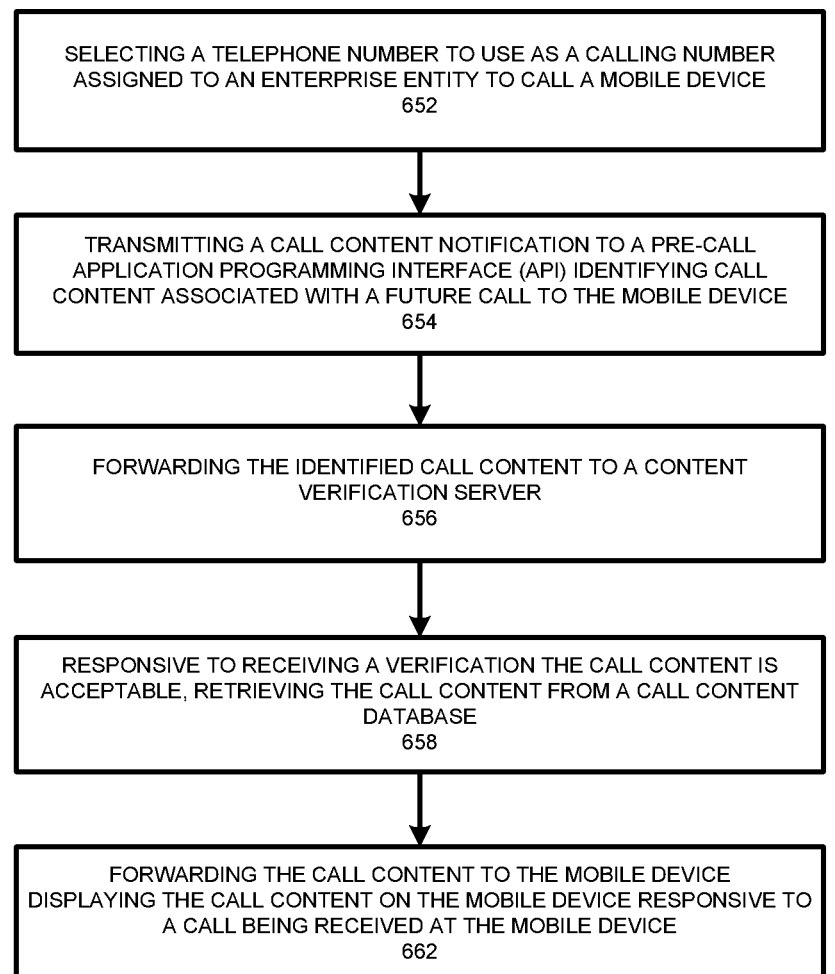

SELECTING A TELEPHONE NUMBER TO USE AS A CALLING NUMBER
ASSIGNED TO AN ENTERPRISE ENTITY TO CALL A MOBILE DEVICE
652

TRANSMITTING A CALL CONTENT NOTIFICATION TO A PRE-CALL
APPLICATION PROGRAMMING INTERFACE (API) IDENTIFYING CALL
CONTENT ASSOCIATED WITH A FUTURE CALL TO THE MOBILE DEVICE
654

FORWARDING THE IDENTIFIED CALL CONTENT TO A CONTENT
VERIFICATION SERVER
656

RESPONSIVE TO RECEIVING A VERIFICATION THE CALL CONTENT IS
ACCEPTABLE, RETRIEVING THE CALL CONTENT FROM A CALL CONTENT
DATABASE
658

FORWARDING THE CALL CONTENT TO THE MOBILE DEVICE
DISPLAYING THE CALL CONTENT ON THE MOBILE DEVICE RESPONSIVE TO
A CALL BEING RECEIVED AT THE MOBILE DEVICE
662

PRE-CALL VERIFICATION OF CALL PARAMETERS

BACKGROUND

Conventionally, caller identification (ID) spoofing refers to the practice of manipulating the information displayed on a recipient device caller ID display to make it appear as if the call is originating from a different phone number or entity than the entity that is actually performing the call. This scam technique is commonly used by scammers and fraudsters to deceive and defraud unsuspecting individuals to trick call recipients into believing they are receiving a call from a known or trusted party.

As branded calling becomes more common and more 'A' numbers start showing a brand there is a need for verification of number ownership on a continuous basis to reduce concerns, such as spoofing and other types of fraud. Displaying the wrong brand display name or blocking an 'A' number that is not owned by the enterprise that set up the call is a concern. Using a traditional verification approach of manually dialing 'A' numbers introduces a cost and a delay in how long it will take to set up a customer on a calling platform.

There may be a large number of branded calling 'A' numbers used with a branded communication exchange ("exchange") that need to have their ownership verified. As stricter rules are employed regarding the usage of 'A' numbers with other call blocking solutions, the ownership of the 'A' numbers becomes more of a concern. If the wrong party claims an 'A' number, the result could be misuse causing damage to an organization's reputation. Also, enterprises may rotate 'A' numbers within their calling platforms. The numbers can go back into pools of 'A' numbers that other companies can start using in their own calling platforms. The result of this 'A' number usage means that verification of these numbers is not a single verification process and must be performed on a continuous basis and for large groups of telephone numbers prior to any calls being placed.

SUMMARY

Example embodiments of the present application provide a method that includes one or more of receiving a plurality of telephone numbers assigned to an enterprise entity, comparing each of the plurality of telephone numbers to a plurality of verification criteria, adding a value to telephone number scores assigned to each of the respective plurality of telephone numbers for each valid instance of the plurality of verification criteria, comparing the telephone number scores to a threshold, and transmitting a notification indicating each of the plurality of telephone numbers which are valid based on the comparing.

Another example embodiment includes an apparatus with a processor configured to perform one or more of receive a plurality of telephone numbers assigned to an enterprise entity, compare each of the plurality of telephone numbers to a plurality of verification criteria, add a value to telephone number scores assigned to each of the respective plurality of telephone numbers for each valid instance of the plurality of verification criteria, compare the telephone number scores to a threshold, and transmit a notification indicating each of the plurality of telephone numbers which are valid based on the comparison.

Another example embodiment includes a non-transitory computer readable storage medium configured to store instructions that when executed cause a processor to perform one or more of receiving a plurality of telephone numbers assigned to an enterprise entity, comparing each of the plurality of telephone numbers to a plurality of verification criteria, adding a value to telephone number scores assigned to each of the respective plurality of telephone numbers for each valid instance of the plurality of verification criteria, comparing the telephone number scores to a threshold, and transmitting a notification indicating each of the plurality of telephone numbers which are valid based on the comparing.

Another example embodiment includes a process that includes one or more of selecting a telephone number to use as a calling number assigned to an enterprise entity to call a mobile device, transmitting a call content notification to a pre-call application programming interface (API) identifying call content associated with a future call to the mobile device, forwarding the identified call content to a content verification server, responsive to receiving a verification the call content is acceptable, retrieving the call content from a call content database, forwarding the call content to the mobile device, and displaying the call content on the mobile device responsive to a call being received at the mobile device.

Another example embodiment includes an apparatus that includes a processor configured to perform one or more of select a telephone number to use as a calling number assigned to an enterprise entity to call a mobile device, transmit a call content notification to a pre-call application programming interface (API) identifying call content associated with a future call to the mobile device, forward the identified call content to a content verification server, responsive to a verification being received that identifies that the call content is acceptable, retrieve the call content from a call content database, forward the call content to the mobile device, and display the call content on the mobile device responsive to a call being received at the mobile device.

Another example embodiment includes a non-transitory computer readable storage medium configured to store instructions that when executed cause a processor to perform one or more of selecting a telephone number to use as a calling number assigned to an enterprise entity to call a mobile device, transmitting a call content notification to a pre-call application programming interface (API) identifying call content associated with a future call to the mobile device, forwarding the identified call content to a content verification server, responsive to receiving a verification the call content is acceptable, retrieving the call content from a call content database, forwarding the call content to the mobile device, and displaying the call content on the mobile device responsive to a call being received at the mobile device.

BRIEF DESCRIPTION OF THE DRAWINGS

FIG. 6A illustrates a flow diagram of an example process for pre-call number verification.

FIG. 6B illustrates a flow diagram of an example process of call content verification.

DETAILED DESCRIPTION

Figure 1:
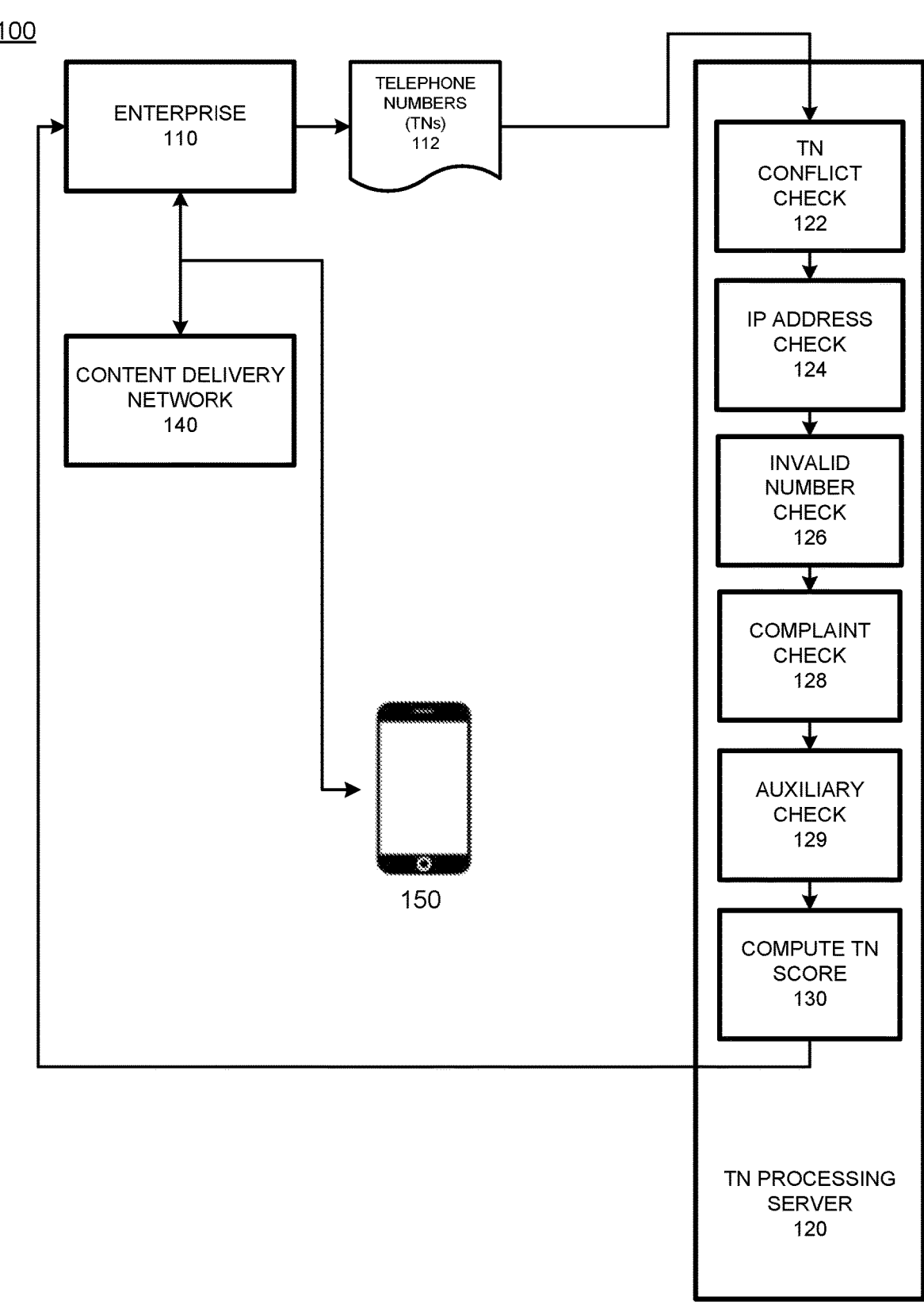
FIG. 1 illustrates a call network configuration process of verifying enterprise calling number(s) according to example embodiments.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide calling number management of calling 'A' telephone numbers (TNs) used by an enterprise to place calls to various end users, such as mobile devices. Enterprise entities (e.g., government entities, corporate entities, etc.) may desire to have their services readily identified by name, descriptions, images, symbols, video, text, and other types of enhanced content delivered to mobile devices when providing calls and/or notifications regarding appointments, services, advertising, etc. Mobile device users require secure communication channels to reduce fraud associated with scam callers and other falsified entities seeking to monetize from users by using unexpected and undesirable approaches, such as solicitation calls and mobile device messages (SMS).

Call enhancement services may be provided as a communication exchange ("exchange"), a call enhancement service application, and/or a content delivery network (CDN). Each entity of the call enhancement platform may be an enterprise server, a cloud server, and/or separate or common server devices which are accessible by mobile devices, enterprise entities and/or other third parties which are participating in the call enhancement process. The call management application may be deployed within a dedicated network 'delegator' device but does not have to be limited to one particular entity in a private network and/or via a cloud computing network. The 'exchange' is a call and data processing computer or other processing entity that manages a branded calling program(s). A 'program' is a group of content/assets, a schedule, and other information that utilizes call data, such as associated telephone numbers, and provides pairing and matching of information for transfer purposes. An organization can have more than one program operating concurrently, and the program that is selected/usable at any particular time may be based on call requirements, except for the case of a pre-call function, in which a valid schedule is required to deliver branded communications.

Programs can be created, deleted, and updated. Schedules, telephone numbers, and assets can be added, deleted, and updated. Data inputs provided to the 'exchange' may come from a customer portal or lightweight APIs or both. The 'exchange' is also the provisioning entity to the application that delivers the branded calling experience to a service provider. The 'exchange' uses brokers to facilitate the program's data management with the application. A valid program is required along with a valid schedule. Pre-call functionality defines the calling/called number pair for a specific upcoming call and any limited period of time in which the call must be placed.

FIG. 1 illustrates a call network configuration process of verifying enterprise calling number(s) according to example embodiments. Referring to FIG. 1, the network configuration 100 includes an enterprise entity 110, such as a corporate office, calling center, cloud computing platform, etc. The calling needs of the enterprise 110 may include batch calling to a large number of phone telephone numbers for advertising purposes and individual calling for specific concerns related to a particular end user account and mobile device 150. A content delivery network 140 may provide a storage for content (e.g., images, video, labels, names, phrases, etc.), intended to be delivered to mobile device 150 during a call. A telephone number (TN) verification/processing server 120 may be a remote entity operating as part of the exchange and/or carrier.

The enterprise calling platform 110 may be any calling platform that is used to dial telephone numbers out to call recipients. The telephone numbers used by the enterprise entity may include one or more 'A' numbers which are known and shared with the number verification server/platform 120 as a separate entity used to verify the authenticity of the 'A' numbers based on known information about the enterprise. The 'A' number(s) may be sent to the calling number verification platform ahead of a verification process being performed.

The calling number verification platform 120 may be used to confirm large volumes of calling party numbers ('A' numbers) on a continuous basis. The automated process attempts to avoid having to manually dial these 'A' numbers for an initial setup verification procedure and again at various time intervals to reverify possession of the number(s) prior to permitting the 'A' numbers to be used and paired with enhanced content during call placement. The various authentication operations may include any one or more of modules 122 through 130.

The enterprise 110 may initiate the beginning of a call number setup process by transferring the 'A' numbers or telephone numbers 112 assigned to the enterprise 110 and intended to be used by the enterprise in the near future (defined by a time period) to a customer portal entity which collects the information and forwards the information to a call exchange which will verify and perform authentication or 'vetting' of the 'A' numbers along with any content that is intended to be paired with those numbers. Each 'A' number may be paired with certain content to be retrieved from the content delivery network 140 and sent with any subsequent calls that are placed to end users, such as mobile device 150. The 'enterprise' may be required to confirm certain information or transfer certain information in order to preserve the right of use for a particular phone number depending on the regulations required by their carrier.

Figure 2:
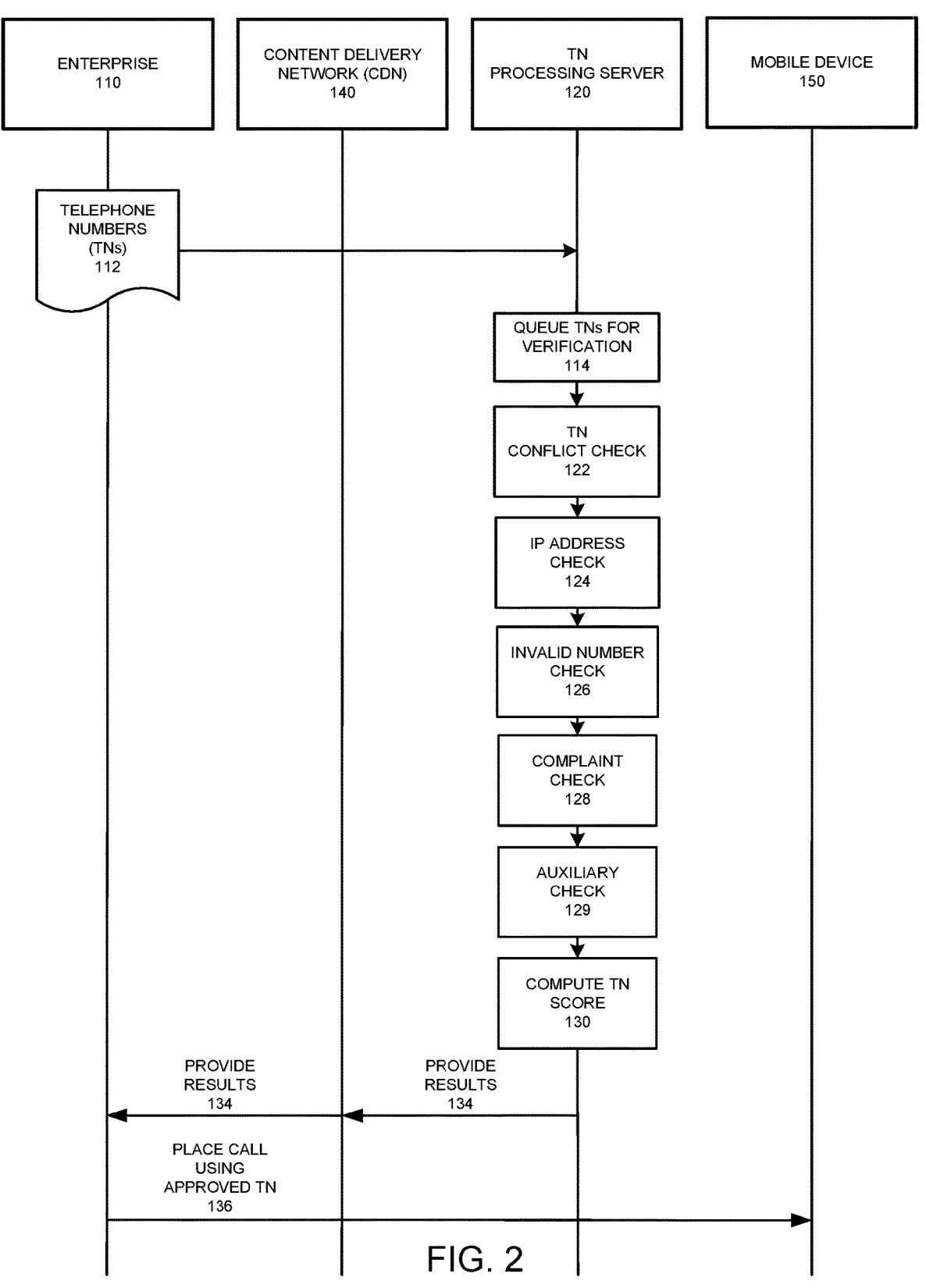
FIG. 2 illustrates a system diagram of enterprise telephone number verification according to example embodiments.

FIG. 2 illustrates a system diagram of enterprise telephone number verification according to example embodiments. In this example, the enterprise 110 may transfer a batch of telephone numbers 112 to the TN processing server 120 for verification. The numbers may be preassigned by a carrier to the enterprise 110 and may include any amount of numbers, such as tens, hundreds or thousands of numbers or more. The verification processes may include one or more procedures used to analyze each telephone number with a set of rules for scoring purposes. The numbers may be queued for review 114 in a memory and linked to a profile of the enterprise entity. In general, one or more of the verification operations 122-130 may be performed to create a pass/fail analysis and/or a score for each verification sub-process, which then can be summed at the end of the verification operations. For example, some operations may be required, such as registration with a federally regulated database, or a listing on a recognized business registration entity, such as Dun and Bradstreet.

A first verification procedure may include comparing the number to known numbers and/or allocated numbers, such as a database of registered numbers 122. This type of verification of TN conflicts may be a pass/fail test since an existing TN would prevent a same telephone number from being used by another entity. Alternatively, this may cause a score increment to be added, such as a value of 10 or 20 with a threshold value of 100 being a maximum fault value by which if that number is assigned to a particular TN then it will be considered unverified since it meets or exceeds that score. Alternatively, the scoring may be a deduction process where scores are deducted from a score total and the higher the score then the more compliant the number.

Another verification process may include an IP address verification where the IP address linked to the enterprise, used during a call signaling event, or stored in a database is identified as being associated with any one particular TN. A verified IP address or one that is not considered illegitimate due to previous assignments by a network monitoring function for purposes, such as spam calling, etc., may receive a value of '0' so not to increase the nonverification value of the specific TN. Also, nationally publicized scam IP address ranges and unallocated IP address ranges may also be detected.

Another example may include an invalid number verification process 126 which may cause a pass/fail assignment or a particular value to be assigned to the TN. For example, if the TN is considered invalid by a cross-reference to a database with invalid numbers, then it may be assigned a fail and/or a large value such as 50, 100, etc., that causes the threshold to be reached so the TN will not be considered verified or will be deemed invalid. Another example may include a complaint check 128, which is similar to the IP address check in that the TN may be linked to a database of complaints and a certain number of complaints may cause a first value, such as 10 and a second number of complaints may cause a second value, such as 20 to be assigned to the TN in which case it may still be considered verified if a sum of all the scores assigned to the TN do not meet or exceed the threshold.

Additional verification procedures may include performing an auxiliary check 129 on each TN to determine if any auxiliary criteria should be used by the carrier to determine whether the TN should be valid or not valid. Once all the scores are assigned to each individual TN by each of the various verification procedures, a sum may be determined for each TN and compared to the verification threshold value to make a verification determination for each TN. Any score total that is less than the verification threshold value may be deemed verified. Alternatively, scores may be added for positive criteria and deducted for negative criteria in which case the threshold value may be required for verification as opposed to requiring the score total to be below the threshold. The score total may be computed 130 and forwarded 134 to the CDN 140 and/or the enterprise and to any other interested party that needs to have the results of which TNs can be used for subsequent calling efforts. The verification process may be performed once a day, once a week, once a month, etc., to ensure the TNs being used are valid and verified. A call may be subsequently placed 136 to a mobile device 150 using one or more approved/verified TNs.

Figure 3:
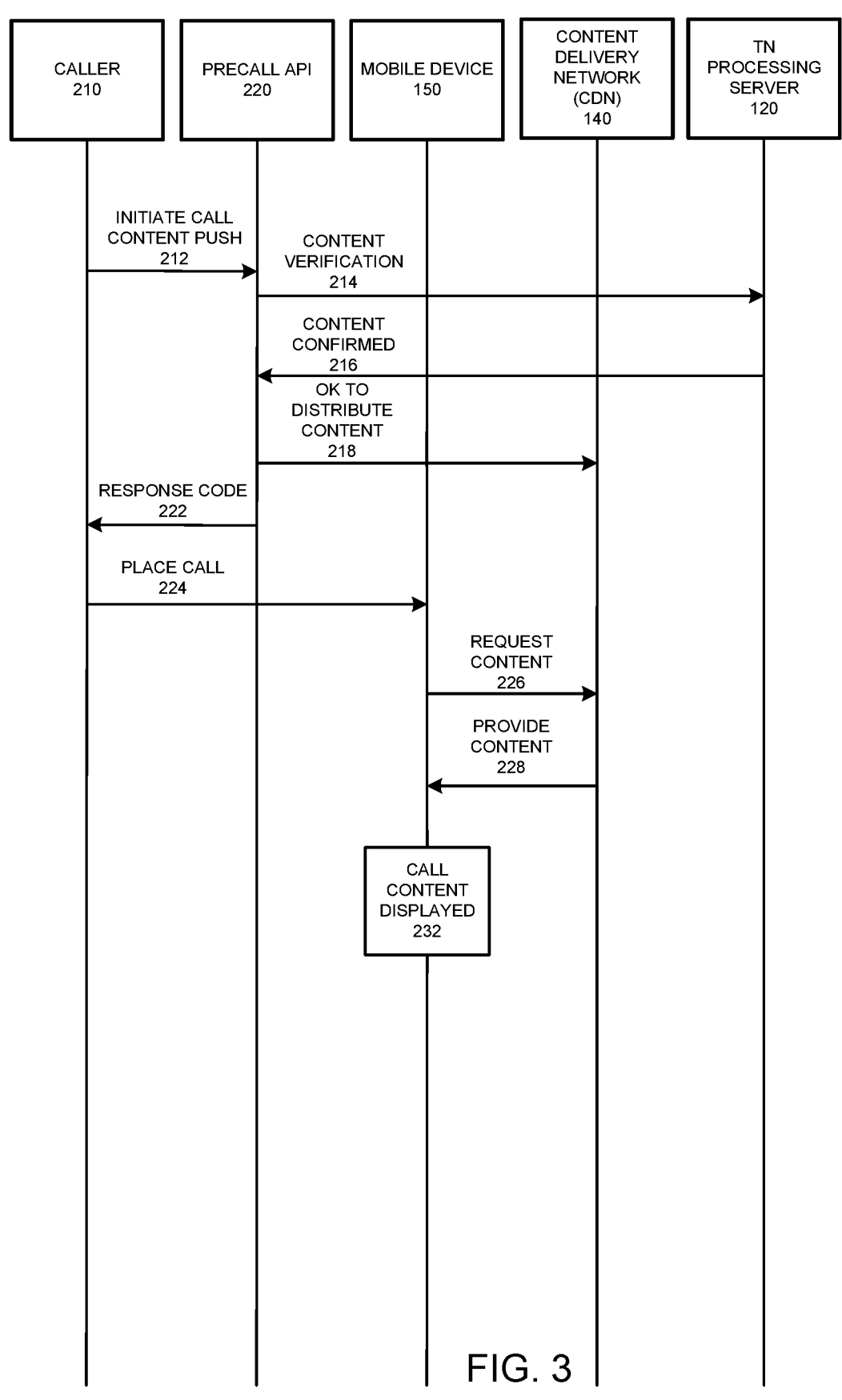
FIG. 3 illustrates a system diagram of enterprise content verification during a call process according to example embodiments.

FIG. 3 illustrates a system diagram of enterprise content verification during a call process according to example embodiments. Referring to FIG. 3, a call process may include an initial pre-call process managed by a pre-call API 220 setup to receive and verify information pertaining to a future call or actual live call. One initial operation performed by the caller 210 may include a content push 212 that attempts to notify the pre-call API 220 of an intent to call a mobile device 150. The content push notification 212 may be an attempt to identify the content (e.g., images, names, labels, messages, etc.) which should be included with a future call. The pre-call API 220 may be a process that is setup on an enterprise calling server to manage pre-call communications and verification processes. The pre-call API 220 may submit a content verification notification 214 to notify the TN processing server 120 that certain call content also needs to be verified. The TN processing server 120 may verify 216 the content has been verified previously via one or more content verification processes (see FIGS. 4 and 5). The pre-call API will receive a confirmation and notify 218 the CDN 140 to distribute the content during and/or before a call is placed to the mobile device 150. The pre-call API may submit a response notification to the caller entity 210 to update the caller that the call content is verified and that a verified telephone number may be used to place a call 224. The mobile device, upon receiving the call, can then request the content 226 and in turn receive the content 228 to display with the call 232. Alternatively, the call content may be sent to the mobile device 150 by a command of the pre-call API 220 and/or the caller 210 prior to the call actually being placed.

Figure 4:
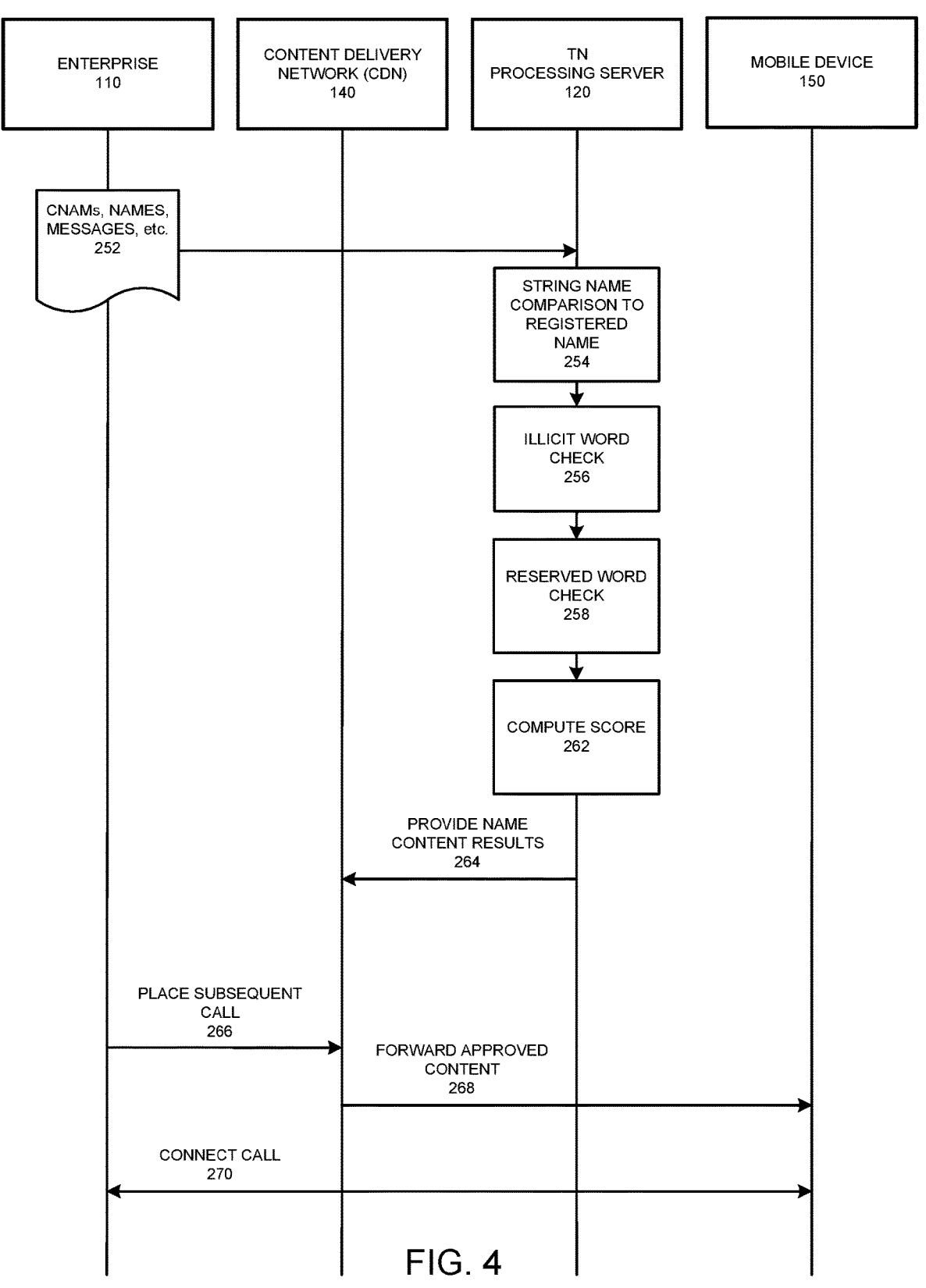
FIG. 4 illustrates a system diagram of enhanced call name verification according to example embodiments.

FIG. 4 illustrates a system diagram of enhanced call name verification according to example embodiments. Referring to FIG. 4, the enhanced content verification process may include forwarding one or more names, phrases, messages, labels, etc., 252 to the TN processing server 120. The criteria for verifying caller names (CNAMs) and other textual based information may include performing a series of operations and computing a comprehensive score. In one example, the verification procedures may include a string name comparison of characters of received content strings (e.g., "Company XYZ", "fraud credit department", "card services, "the only plastic for your wallet", etc.) to a list of known strings. Additionally, string comparison 254 may include verification of terms which are acceptable by comparison to terms that are unacceptable. For example, limiting gambling and 'get rich quick' schemes and trying to promote fundamental business terms and phrases. An illicit word check may be performed 256 to eliminate verification of content which includes a list of bad words, derogatory words, hateful words, etc. Similarly, a reserved word check 258 may seek to eliminate words which are not available to use, for example, no previously unknown or registered entity should be using terms, such as "IBM", "Microsoft", since those terms are already reserved by entities affiliated with those businesses. Any of those example screening operations may cause points to be added/subtracted to a total score calculated 262 as a sum of all points distributed/deducted from a total score for each content element examined by the server 120. The results of the scoring may be sent 264 to the CDN 140 so the content items that are approved are identified for future call content forwarding. The process may include placing a call 266 and forwarding one or more content items 268 responsive to the call being placed. A call is then connected 270 between the calling entity 110 and the mobile device 150.

Figure 5:
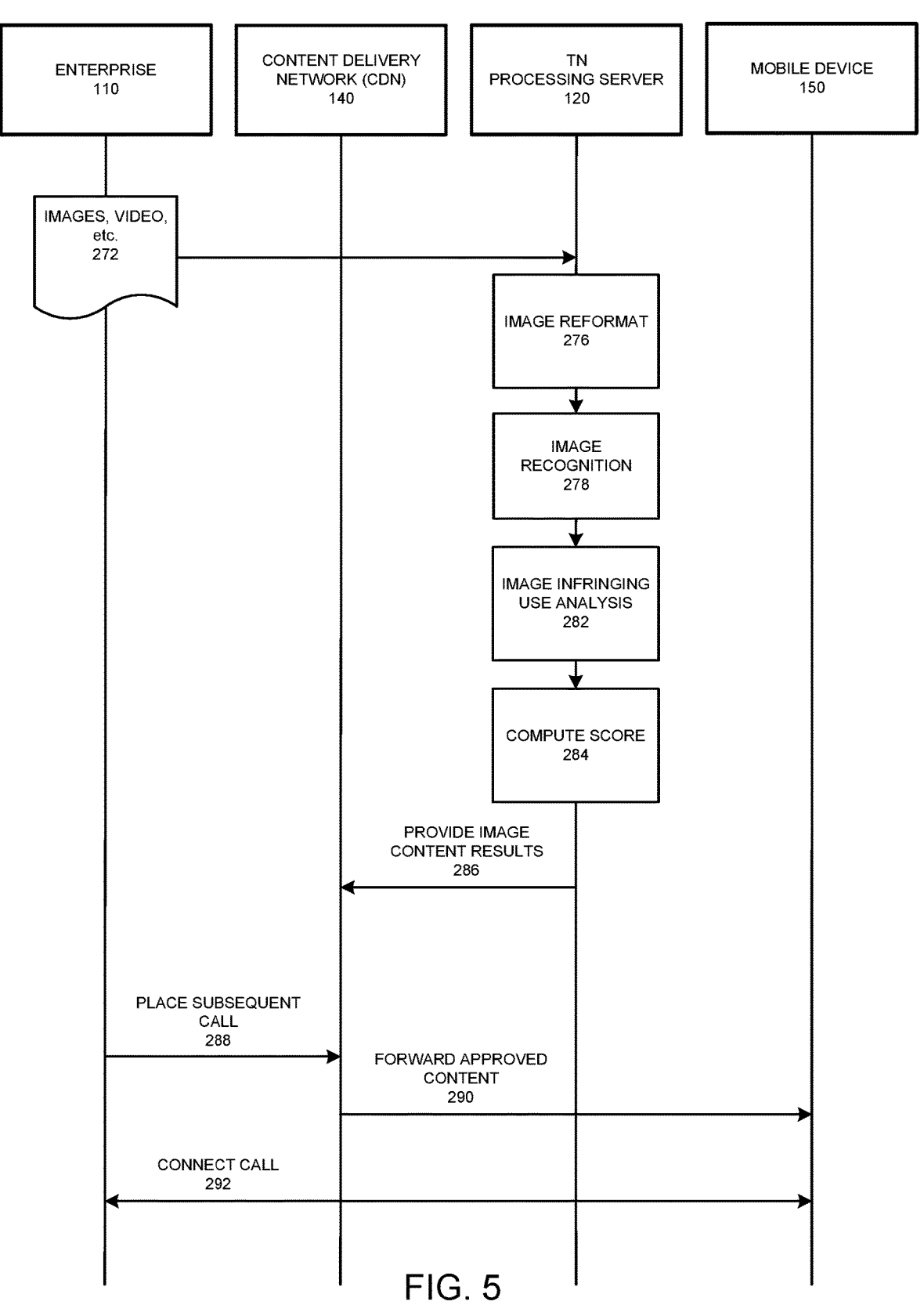
FIG. 5 illustrates a system diagram of enhanced call image verification according to example embodiments.

FIG. 5 illustrates a system diagram of enhanced call image verification according to example embodiments. Referring to FIG. 5, the process for verifying content images, videos, and other types of media may be different from the string verification processes of FIG. 4. The images, video and other information 272 may be sent to the verification server 120. The images may be reformatted 276 to a particular format type that is accepted for the automated verification processes which may require a certain file size, file type, resolution etc. The process may include image recognition 278 which compares the content of the image with known content to identify whether the image includes known objects, inappropriate content, etc. The analysis may yield a pass/fail grade and/or a score assignment that causes the image to be less or more likely to be verified. If an image is identified as being suspect and unclear, the score assigned to that image may reduce the likelihood that particular image will be considered verified. A similar analysis may be performed to ensure the image is not fraudulent and infringing 282 on another known entity that is not registered with the entity seeking authentication of the image. This type of analysis may be a pass/fail process that passes or fails to image if it is determined to be a copy or infringement of a known image. A score may be computed 284 based on the totality of authentication operations 276-282 and any other criteria necessary to authenticate the enhanced call content. The results 286 are sent to the CDN 140 where the content status is updated to identify the content verification status. When a call is placed 288, the approved content may be forwarded to the mobile device 290 and the call may be connected 292 and the content displayed on the mobile device 290.

In one example, a business entity or other enterprise entity may seek to have TNs and enhanced call content managed and verified for its customers and may require compliance with third party compliance agencies. The entity may use the same customer portal interface to register TNs and use a program to make their phone calls display, for example, their business name and reason for calling. In operation, a web interface is integrating the calling APIs such as "Register Phone Numbers", "Create Program", and "Create Delivery Channel". The APIs are also coordinating with other components of the platform, such as a database for tracking all the data, TN server for verifying the entity registration and content, and distribution streams for relaying all the approved information to downstream partners to fulfill delivery of the 'branding' of calls with respective partners.

The exchange database or 'DB' is a component of the platform which manages the storage, retrieval, updates, and backup of all data. All data services may be performed in the cloud and this may enable distributing data to downstream applications. In addition to the primary storage, the DB component also consists of a data storage of all the exchange data. Specifically, the data may be continuously replicated from. The data storage supports a variety of other features and use cases such as large scale number search and filtering as well as analytics and monitoring dashboards.

When a "Register Business" API is called, the API leverages the DB to store a record of the entity details that were provided, such as a legal name, email recipients, website, industry, and more. This information is stored in the DB, which automatically replicates the data in multiple regions. Distribution partners will also receive notifications of the business registration event from the DB so they may also setup records.

As entities and content are uploaded to the platform, the information must be verified before live calls are placed. The verifying may include determining the genuineness of an entity's existence, that they are who they say they are, that they are using branded communications for the reasons they say they are, and of course to be held accountable to industry regulations such as the telephone consumer protection act (TCPA).

The orchestrator or TN server 120 is the component of the exchange platform which handles all aspects of entity and content verification. The data is first queued to be verified as soon as it is entered into the exchange. The system will orchestrate a series of checks and models, which may be heuristic logic-based models or machine learning models. The selection of models to use, as well as settings for fine-tuning the models, is dynamically configurable by policies which may be JSON-formatted documents explicitly listing a business, phone number, and content rules.

While new entity registrations and updates are automatically queued for vetting. Different resellers, industries, and delivery channels may have various levels of risk and therefore may require scheduled re-verification for continued quality checks. After the orchestrator function implements the necessary rules/models, the results may be combined into a final score with a reason for its determination. This is used to map the final score into an action such as approving the business, rejecting the business, or opening a ticket to receive manual verification by a verification team.

After the verification server 120 or 'orchestrator' executes the rules specified in the policy, it may calculate a final score for the new business event. If the business passed and received a good score above or below a threshold, the orchestrator may change the status of the business in the exchange to 'APPROVED', permitting it to register its numbers and if authorized to set up branded calling.

In one example, an updated verification may cause a legal name change to cause a business to appear suspicious, but not necessarily shut down. In this case, the orchestrator takes a different course of action by changing the status of the business to 'UNDER REVIEW' and opening a notification for further review.

In another example, a business may want to brand their calls with enhanced content and upload a display name and a logo image to the exchange. Just like the entity itself, this data is immediately queued for verification, and the orchestrator uses the respective policy for the queue entry to identify which content rules to execute. For the display name, the policy in this scenario may be written to instruct the system to check for similarity between the display name and the business legal name, as well as check for vulgar words or restricted words. For the logo, the policy in this scenario is to instruct the system to check for illicit content such as a pornographic imagery, violence, etc., using image recognition machine learning. The policy may also instruct the system to check the image for fortune 500 company logos, or well-known logos, for attempted misuse or impersonation of these brands. Upon running the checks, if the content passes the required tests, the orchestrator then changes the status of the records to 'APPROVED', so they can be used in branded calling products. For verification of the telephone numbers (TNs), the policy in this example is written to instruct the system to check if the number is invalid or unallocated, has any FTC or FCC complaints which are logged, and/or already has a known caller name (CNAM) value that closely matches the business's legal name or "Doing Business As" alias. If the TN passes this verification, the orchestrator then changes its status to 'APPROVED', allowing it to be protected from false fraud tagging and, if authorized, branded calling.

FIG. 6A illustrates a flow diagram of an example process for pre-call number verification. An enterprise calling party ('A' number party) may have a number of TNs requiring authorization. The TN server may receive a plurality of telephone numbers 610 assigned to an enterprise entity by a batch send operation sent from the enterprise to the TN server processing entity. The process may include comparing each of the plurality of telephone numbers to a plurality of verification criteria 612, such as any one or more of the operations of FIG. 2. The process may also include adding a value 614 to telephone number scores assigned to each of the respective plurality of telephone numbers for each valid instance of the plurality of verification criteria, such as a marginal value of 10 or more. The value may be deducted instead of added depending on how the scoring is performed. The score may be a high score that is optimal and indicates the TN or TNs are verified, or the score may be a low score that is optimal based on how low the score is or how close to zero the score measures. The process may also include comparing the telephone number scores to a threshold for each TN 616 and transmitting a notification indicating each of the plurality of telephone numbers which are valid based on the comparing to the enterprise or another entity responsible for maintaining the valid TNs 618.

The process may also include adding a first portion of the value, such as a marginal score to a telephone number score assigned to a first telephone number when the telephone number does not conflict with another telephone number identified by a carrier as a first verification criteria, such as based on a database of known numbers, and adding a second portion of the value to the telephone number score assigned to the first telephone number when the telephone number is linked to an IP address that is not on a deny list as a second verification criteria. The total score is what is used to compare to the scoring criteria. The process may also include adding a third portion of the value to the telephone number score assigned to the first telephone number when the telephone number is not on a complaint list as a third verification criteria.

The notification may be transmitted to a plurality of carrier networks. The process may also include transmitting a call from the enterprise entity using a valid telephone number among the plurality of valid telephone numbers, identifying a call has been transmitted by a content delivery network device, and retrieving one or more content items to pair with the call based on the valid telephone number. The process may also include comparing the telephone number scores to a threshold by comparing a comprehensive score assigned to each of the telephone numbers based on each of the plurality of verification criteria to the threshold.

FIG. 6B illustrates a flow diagram of an example process of call content verification. Referring to FIG. 6B, the process may include selecting a telephone number to use as a calling number assigned to an enterprise entity to call a mobile device 652, transmitting a call content notification to a pre-call application programming interface (API) identifying call content associated with a future call to the mobile device 654. The call content may be one or more of various stored content elements, such as video, images, strings, phrases, logos, etc. The process may also include forwarding the identified call content to a content verification server 656, and responsive to receiving a verification the call content is acceptable, retrieving the call content from a call content database 658, forwarding the call content to the mobile device and displaying the call content on the mobile device responsive to a call being received at the mobile device 662.

The process may also include receiving a display name associated with the calling number at the verification server, comparing the display name to a known company name stored in a database, and assigning a score to the display name based on a similarity between the display name and the company name. The process may also include receiving a display name as part of the call content associated with the calling number at the verification server, identifying whether any illicit terms are included in the display name based on a database of stored illicit terms, and assigning a score to the display name based one or more identified illicit terms, receiving an image as part of the call content associated with a calling number assigned to an enterprise entity to call a mobile device, processing image content of the image to identify illicit image data based on a database of known illicit image data and assigning a score to the image based on one or more identified illicit image data.

The process may also include assigning a composite score to the calling number based on the score assigned to the display name and the score assigned to the image, the call content is verified when the composite score is above a threshold value. The process may also include forwarding the identified call content to a content verification server by forwarding one or more images associated with the calling number and the one or more images are reformatted prior to the call content being verified.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

A storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7:
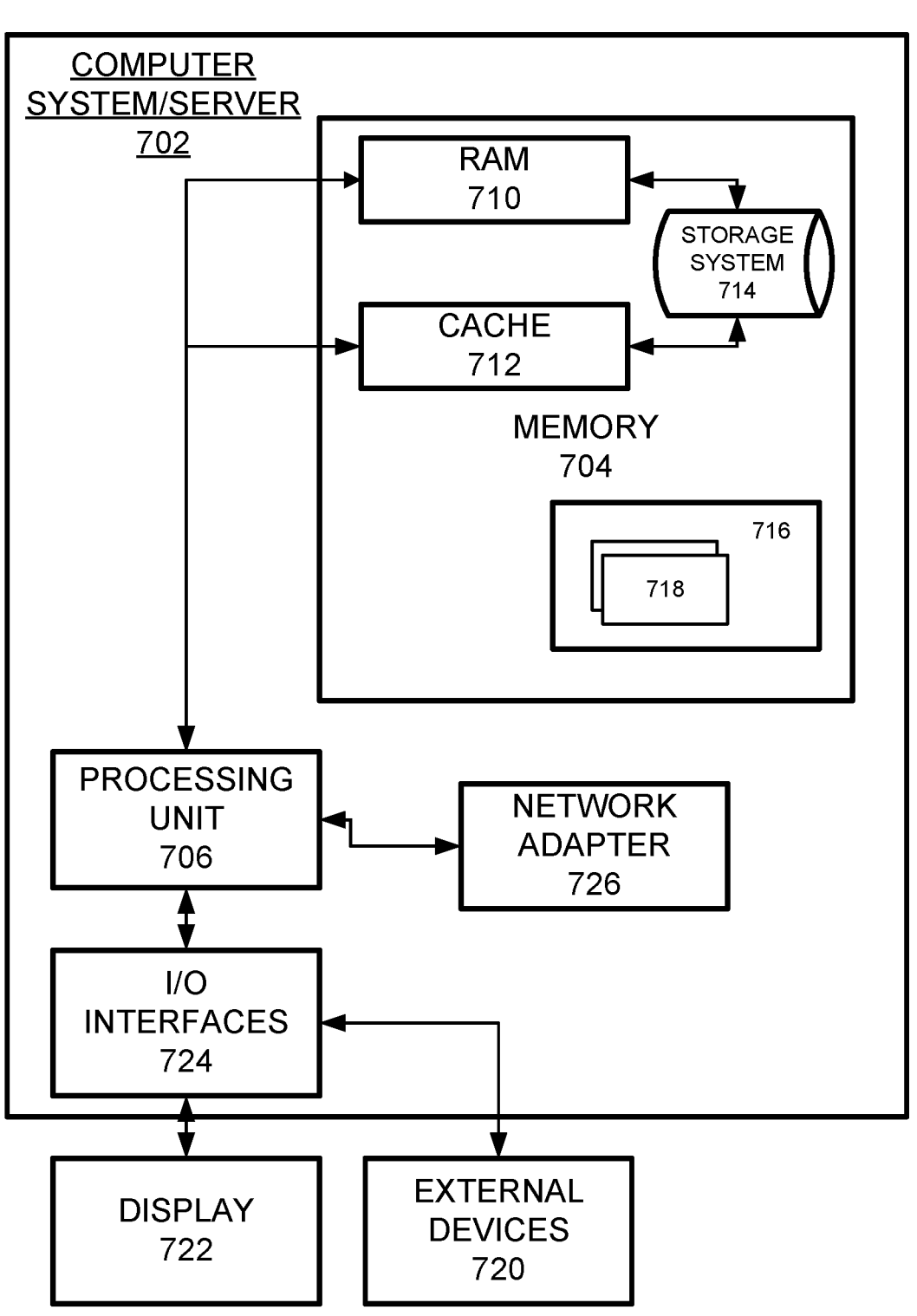
FIG. 7 illustrates an example network entity device configured to store instructions, software, and corresponding hardware for executing the same according to example embodiments.

FIG. 7 illustrates an example system 700 that supports one or more of the example embodiments described and/or depicted herein. The system 700 comprises a computer system/server 702, which is operational with numerous other general purpose or special purpose computing system environments or configurations. Examples of computing systems, environments, and/or configurations that may be suitable for use with computer system/server 702 include, but are not limited to, personal computer systems, server computer systems, thin clients, thick clients, hand-held or laptop devices, cell phones, multiprocessor systems, micro-processor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in the example system 700 is shown in the form of a computing device. The components of computer system/server 702 may include, but are not limited to, at least one of the depicted components including, for example, processors or processing units (processor 704), a system memory 706, and a bus that couples various system components including the system memory 706 to the processor 704. Although only a single computer system/server 702 is depicted, more than one computer system/server 702, whether directly connected or communicatively connected via a wired or wireless network, can be utilized with any of the example embodiments and with any of the components described or depicted herein.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. The system memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, the system memory 706 may include at least one program product having a set (e.g., at least one) of program modules that are configured to carry out the functions of various embodiments of the application.

Program/utility 716, having a set (at least one) of program modules 718, may be stored in the system memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc., one or more devices that enable a user to interact with computer system/server 702, and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components and networks (including private and private cloud networks) could be used in conjunction with computer system/server 702. Examples include, but are not limited to devices containing a processor and/or memory (such as a cell phone, watch, personal computer, laptop, and the like), microcode, device drivers, redundant processing units, external disk drive arrays, RAID systems, tape drives, and data archival storage systems, etc.

Although an embodiment of at least one of a system, method, and non-transitory computer readable storage medium has been illustrated in the accompanying drawings and described in the foregoing detailed description, it will be understood that the application is not limited to the embodiments disclosed but is capable of numerous arrangements, rearrangements, modifications, and substitutions as set forth and defined by the following claims. For example, the system's capabilities of the various figures can be performed by one or more of the modules or components described herein or in a distributed architecture and may include a transmitter, receiver, or pair of both. For example, all or part of the functionality performed by the individual modules may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via a plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone, or any other suitable computing device, or combination of devices. Presenting the above-described functions as being performed by a "system" is not intended to limit the scope of the present application in any way but is intended to provide one example of many embodiments. Indeed, methods, systems, and apparatuses disclosed herein may be implemented in localized and distributed forms consistent with computing technology.

It should be noted that some of the system features described in this specification have been presented as modules in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only, and the scope of the application is to be defined solely by the appended claims when considered with a full range of equivalents and modifications (e.g., protocols, hardware devices, software platforms, etc.) thereto.

What is claimed is:
1. A method comprising:
receiving a plurality of telephone numbers assigned to an enterprise entity;
comparing each of the plurality of telephone numbers to a plurality of verification criteria;
adding a value to telephone number scores assigned to each of the respective plurality of telephone numbers for each valid instance of the plurality of verification criteria;
comparing the telephone number scores to a threshold; and
transmitting a notification indicating each of the plurality of telephone numbers which are valid based on the comparing,
wherein a call from the enterprise entity is transmitted by a content delivery network device using a valid telephone number among the plurality of valid telephone numbers,
wherein one or more content items to pair with the call is retrieved based on the valid telephone number.
2. The method of claim 1, comprising
adding a first portion of the value to a telephone number score assigned to a first telephone number when the telephone number does not conflict with another telephone number identified by a carrier as a first verification criteria.
3. The method of claim 2, comprising
adding a second portion of the value to the telephone number score assigned to the first telephone number when the telephone number is linked to an IP address that is not on a deny list as a second verification criteria.
4. The method of claim 3, comprising
adding a third portion of the value to the telephone number score assigned to the first telephone number when the telephone number is not on a complaint list as a third verification criteria.
5. The method of claim 1, wherein the notification is transmitted to a plurality of carrier networks.
6. The method of claim 1, wherein the comparing the telephone number scores to a threshold comprises compar- ing a comprehensive score assigned to each of the telephone numbers based on each of the plurality of verification criteria to the threshold.

7. An apparatus comprising:
a processor configured to
    receive a plurality of telephone numbers assigned to an enterprise entity;
    compare each of the plurality of telephone numbers to a plurality of verification criteria;
    add a value to telephone number scores assigned to each of the respective plurality of telephone numbers for each valid instance of the plurality of verification criteria;
    compare the telephone number scores to a threshold; and
    transmit a notification indicating each of the plurality of telephone numbers which are valid based on the comparison,
    wherein a call from the enterprise entity is transmitted by a content delivery network device using a valid telephone number among the plurality of valid telephone numbers,
    wherein one or more content items to pair with the call is retrieved based on the valid telephone number.

8. The apparatus of claim 7, wherein the processor is further configured to
    add a first portion of the value to a telephone number score assigned to a first telephone number when the telephone number does not conflict with another telephone number identified by a carrier as a first verification criteria.

9. The apparatus of claim 8, wherein the processor is further configured to
    add a second portion of the value to the telephone number score assigned to the first telephone number when the telephone number is linked to an IP address that is not on a deny list as a second verification criteria.

10. The apparatus of claim 9, wherein the processor is further configured to
    add a third portion of the value to the telephone number score assigned to the first telephone number when the telephone number is not on a complaint list as a third verification criteria.

11. The apparatus of claim 7, wherein the notification is transmitted to a plurality of carrier networks.

12. The apparatus of claim 7, wherein the comparison of the telephone number scores to a threshold comprises a comparison of a comprehensive score assigned to each of the telephone numbers based on each of the plurality of verification criteria to the threshold.

13. A non-transitory computer readable storage medium configured to store instructions that when executed cause a processor to perform:
    receiving a plurality of telephone numbers assigned to an enterprise entity;
    comparing each of the plurality of telephone numbers to a plurality of verification criteria;
    adding a value to telephone number scores assigned to each of the respective plurality of telephone numbers for each valid instance of the plurality of verification criteria;
    comparing the telephone number scores to a threshold; and
    transmitting a notification indicating each of the plurality of telephone numbers which are valid based on the comparing,
    wherein a call from the enterprise entity is transmitted by a content delivery network device using a valid telephone number among the plurality of valid telephone numbers,
    wherein one or more content items to pair with the call is retrieved based on the valid telephone number.

14. The non-transitory computer readable storage medium of claim 13, wherein the processor is further configured to perform
    adding a first portion of the value to a telephone number score assigned to a first telephone number when the telephone number does not conflict with another telephone number identified by a carrier as a first verification criteria.

15. The non-transitory computer readable storage medium of claim 14, wherein the processor is further configured to perform
    adding a second portion of the value to the telephone number score assigned to the first telephone number when the telephone number is linked to an IP address that is not on a deny list as a second verification criteria.

16. The non-transitory computer readable storage medium of claim 15, wherein the processor is further configured to perform
    adding a third portion of the value to the telephone number score assigned to the first telephone number when the telephone number is not on a complaint list as a third verification criteria.

17. The non-transitory computer readable storage medium of claim 13, wherein the notification is transmitted to a plurality of carrier networks.

\* \* \* \* \*